United States Patent [19]

Karstensen

[11] Patent Number: 4,830,454
[45] Date of Patent: May 16, 1989

[54] SPHERICAL PLANOCONVEX LENS FOR OPTICALLY COUPLING A SEMICONDUCTOR LASER TO AN OPTICAL WAVEGUIDE

[75] Inventor: Holger Karstensen, Munich, Fed. Rep. of Germany

[73] Assignee: Siemens Aktiengesellschaft, Berlin and Munich, Fed. Rep. of Germany

[21] Appl. No.: 261,488

[22] Filed: Oct. 24, 1988

[30] Foreign Application Priority Data

Nov. 6, 1987 [DE] Fed. Rep. of Germany ....... 3737810

[51] Int. Cl.$^4$ ............................ G02B 6/32; G02B 3/00
[52] U.S. Cl. ................................ 350/96.18; 350/96.15; 350/96.17; 350/416
[58] Field of Search ................ 350/96.18, 96.17, 96.15, 350/416; 250/227

[56] References Cited

U.S. PATENT DOCUMENTS

| 3,628,027 | 12/1971 | Brauss ................................. 350/416 |
| 4,256,365 | 3/1981 | Lemesle et al. ................... 350/96.18 |
| 4,380,365 | 4/1983 | Gross ................................. 350/96.18 |
| 4,721,353 | 1/1988 | Khoe et al. ....................... 350/96.18 |
| 4,753,521 | 6/1988 | Deserno ........................... 350/96.18 |

OTHER PUBLICATIONS

Yamashita et al., "High-efficiency LD Coupler with a Truncated Si Spherical Lens", *Technical Digest, Conference on Optical Fiber Communication, Third International Conference on Optical Fiber Sensors,* '85, San Diego, 1985, pp. 48–49, TUL2.

Primary Examiner—William L. Sikes
Assistant Examiner—Georgia Y. Epps
Attorney, Agent, or Firm—Hill, Van Santen, Steadman & Simpson

[57] ABSTRACT

A spherical planoconvex lens for optically coupling a semiconductor laser to an optical waveguide characterized by a thickness of the lens from a planar surface to a vertex of the spherical convex lens surface being greater than the radius of the spherical convex surface but small enough that a focal point of the lens on a laser side lies outside of the lens at a small distance from the planar lens surface. The lens can be formed of either silicon or germanium and has a higher coupling efficiency than is achieved with previously known hemispherical planoconvex lenses of silicon.

3 Claims, 1 Drawing Sheet

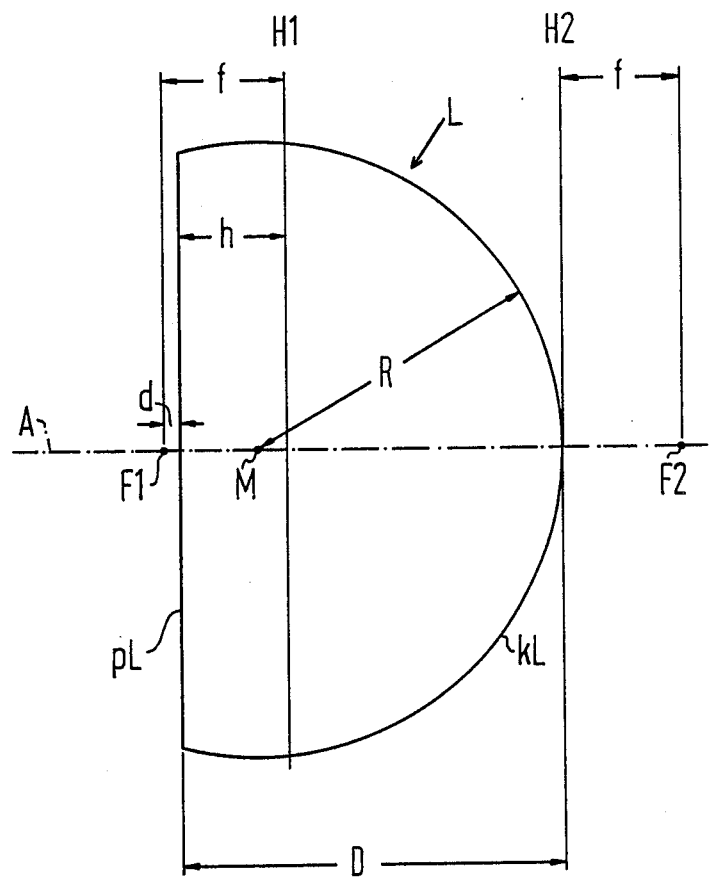

SPHERICAL PLANOCONVEX LENS FOR OPTICALLY COUPLING A SEMICONDUCTOR LASER TO AN OPTICAL WAVEGUIDE

BACKGROUND OF THE INVENTION

The present invention is directed to a spherical planoconvex lens for optically coupling a semiconductor laser to an optical waveguide. The coupling is accomplished by the lens being disposed in the beam path between the laser and the waveguide with a planar lens surface facing towards the laser and the lens being composed of refractive material that is transparent for the laser emission.

A lens of this type is known from Techn. Digest, Conf. on Opt. Fiber Commun., Optical Fiber Sensors, '85, San Diego, 1985. This lens is composed of silicon, is hemispherical and has an extremely low spherical aberration. Thus a lens is established with which a high coupling efficiency from the semiconductor laser to the waveguide is achieved. A high coupling efficiency is of interest in optical communication technology because of the higher line length connected therewith.

SUMMARY OF THE INVENTION

The object of the present invention is to create a lens with which an even higher coupling efficiency can be achieved than achieved by the known planoconvex lenses.

These objects are achieved in an improvement in a spherical planoconvex lens for an optical coupling a semiconductor laser to an optical waveguide wherein the lens is positioned in a beam path of the laser between the laser and waveguide and has its planar lens surface facing towards the laser and the lens is composed of refractive material that is transparent for the laser emission. The improvements are that the lens has a thickness, which is measured from the planar lens surface to the opposite vertex of the spherical convex lens surface of the lens, being greater than the radius of the spherical convex lens surface but still small enough that the focal point of the lens at the laser side lies outside of the lens at a distance d from the planar lens surface.

The lens of the invention is optimized to the effect that the small distance between the focal point and the planar lens surface is observed. This represents a compromise between minimum spherical aberration and thus a high coupling efficiency and an adequate protection of the semiconductor laser against mechanical damage during adjustment.

The spherical aberration is all the lower the higher the refractive index of the refractive material of the lens that is transparent for the laser emission. It is therefore advantageous to select the refractive index of this material as high as possible.

In one preferred embodiment of the lens of the present invention, the lens is composed of silicon having a refractive index of 3.5 and is transparent for a wavelength of about 1.1 $\mu$m. The lens has a lower spherical aberration than known lenses of silicon.

In another preferred embodiment, the lens is composed of germanium that has an even higher refractive index of 4.0 and is suitable for wavelengths up to about 20 $\mu$m. This lens also has a lower spherical aberration than known lenses of silicon.

Other features of present invention will be readily apparent from the following description of the preferred embodiment, the drawings and claims.

BRIEF DESCRIPTION OF THE DRAWINGS

The FIGURE is a side view of the lens in accordance with the present invention.

DESCRIPTION OF THE PREFERRED EMBODIMENTS

The principles of the present invention are particularly useful and incorporated in a planoconvex lens generally indicated L in the FIGURE. The lens L has a planar lens surface pL and and spherical convex surface kL. The lens L has an optical axis A and has a thickness D. In addition, the lens L will have a center M which is on the axis A and a radius R which is the radius of the spherical convex surface kL.

The focal point on a laser side is F1 and the focal point on the waveguide side is F2. The laser spot from which the laser emission leaves is to be arranged in the focal point F1 wherein the end face of the waveguide into which the light is being incoupled is arranged at the other focal point F2. The principal plane of the lens allocated to the focal point F1 is H1 and the principal plane of the lens allocated to the focal point F2 and H2. The focal length of the lens is f. The focal point F1 on the laser side is arranged outside of the lens at a small distance d from the planar lens surface pL. The thickness D of the lens is greater than the radius R of the spherical lens surface kL. Valid for the focal length f is $f=R/(n-1)$ and $h=D/n$, wherein the distance h is the distance of the planar lens surface pL from the principal plane H1 and n is the refractive index of the transparent material for the lens.

The lens L can be made in a very simple way by grinding a sphere, preferably a silicon sphere or a germanium sphere, to produce the flat planar surface pL. In order to avoid reflective losses, the lens must be provided with an anti-reflection coating for the operating wave length or for the range of operating wave lengths. This anti-relection coating can be undertaken simply in a conventional way by vapor depositing of reflection reducing layers.

Although I have described my invention by reference to particular illustrative embodiments thereof many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a spherical planoconvex lens for optically coupling a semiconductor laser to an optical waveguide, by the lens being positioned in a beam path coming from the laser with a planar lens surface facing towards the laser and a spherical convex lens surface facing towards the waveguide, said lens being composed of a refractive material that is transparent for the laser emission, the improvements comprising the lens having a thickness, which is measured from the planar lens surface to the vertex of the spherical convex surface of the lens, greater than the radius of the spherical convex surface but still small enough that a focal point of the lens for the laser side lies outside of the lens at a distance d from the planar lens surface.

2. A lens according to claim 1, wherein the transparent refractive material of the lens is silicon.

3. In a lens according to claim 1, wherein the transparent refractive material of the lens is germanium.

* * * * *